Patented May 9, 1950

2,506,892

UNITED STATES PATENT OFFICE 2,506,892

COLORATION OF TEXTILE FABRICS

Jack Augustus Radley, Beddington, near Croydon, England, assignor to Imperial Chemical Industries Limited, a corporation of Great Britain No Drawing. Application December 26, 1946, Serial No. 718,605. In Great Britain December 31, 1945

4 Claims. (Cl. 117—161)

This invention relates to improvements in the colouration of textile fabrics and more particularly to improvements in the colouration of textile fabrics with pigments.

It has already been proposed to colour textile fabrics by applying thereto aqueous dispersions of pigments containing thermoplastic or thermohardening film-forming materials as binders therefor and thereafter drying the fabric and, if desired, subjecting it to a baking treatment so as to cause the film-forming binder to fix the pigment on to the fabric.

Considerable difficulties are experienced in practice when colouring textile fabrics in this manner due to uneven migration of the pigment particles, during the drying of the fabrics, especially with hot air, and the consequent production of unattractive and unlevel coloured effects.

We have now found that the addition of a small proportion of a water-soluble salt of a polymeric acrylic or methacrylic acid to a pigment composition of the kind hereinbefore described considerably enhances its utility. Thus, when using the compositions containing such additives for the colouration of textile fabrics, no difficulties are experienced due to migration of the pigment particles, and no difficulties are experienced in obtaining attractive and level colourings. Further, the presence of the small proportions of the additive, surprisingly, does not cause any appreciable diminution of the washfastness of the colourings.

According to the present invention in the colouring of textile fabrics by a process which comprises applying thereto an aqueous dispersion of a pigment containing a film-forming material as a binder for the pigment and thereafter drying the so treated fabric and, if desired, subjecting it to a heat treatment whereby the film-forming material is caused to fix the pigment on to the fabric, we provide the improvement which comprises incorporating with the aqueous dispersion a proportion of a water-soluble salt of a polymeric acrylic or methacrylic acid varying from 0.01% to 0.20% by weight based on the total weight of the dispersion.

Preferably the proportion of the water-soluble salt of the polymeric acrylic or methacrylic acid is from 0.025% to 0.075% by weight based on the total weight of the dispersion.

Any film-forming material which is soluble in water or aqueous fluids or is capable of forming an aqueous dispersion may be used as the binder for the pigment. More than one of such materials may be used if desired. Examples of film-forming materials are amine-, ketone- or phenol-formaldehyde resins as such or in the form of water-soluble pre-condensates, polyhydric alcohol-polybasic acid resins, cellulose derivatives, vinyl and acrylic polymers, polythene and natural or synthetic rubbers. Conventional plasticisers for these materials may also be used. Preferably, the film-forming material is a water-insoluble material, in which case it is applied in the form of an aqueous dispersion or, alternatively, it is a water-soluble material or materials which can be subsequently rendered insoluble in water by a heat treatment.

The dispersions to be applied to the fabric should be negatively charged otherwise the addition of the water-soluble salt of the polymeric acrylic or methacrylic acid thereto will cause precipitation of the ingredients thereof.

Any organic or inorganic pigment may be used. Examples of pigments are carbon black, ultramarine, oxides of iron, phthalocyanine pigments and azo pigment dyestuffs which are not dissolved by alkali, for example:

(a) The dyestuff formed by coupling one mol of diazotized para-chlor-ortho-nitroaniline with one mol of aceto-acet-ortho-chlor anilide.

(b) The dyestuff formed by coupling two mols of phenyl-methyl pyrazolone with one mol of tetrazotized 3,3'-dichlorobenzidine.

(c) The dyestuff formed by diazotizing one mol of 2,5-dichloroaniline and coupling with one mol of the para-toluidide of beta-oxy-naphthoic acid.

(d) The dyestuff formed by diazotizing one mol of 5-chlor-2-amino-toluene and coupling with one mol of the ortho-toluidide of beta-oxy-naphthoic acid.

(e) The ferric sodium salt of 1-nitroso-2-naphthol-6-sulfonic acid (Col. Ind. #5).

The compositions comprising the pigment and the film-forming binder may be made in any conventional manner, and they may be applied to the fabric in accordance with conventional practice, for example, by spraying, dipping, padding or spreading. The water-soluble salts of the polymeric acrylic or methacrylic acid may be added to the compositions when convenient.

The drying operation may be in accordance with conventional practice. Particularly suitable are drying methods employing hot air, for example, by means of stenter or festoon driers.

The heat treatment may be in accordance with conventional practice and should be under conditions such that the film-forming material is softened or, if necessary, further condensation or hardening is effected so that the finish acquires resistance to wet processing treatments.

Suitable water-soluble salts of the polymeric acrylic or methacrylic acids include, for example, the alkali metal, ammonium or amine salts. The quantities of the salts are critical; too little does not produce the desired effects and too much, apart from being wasteful, undesirably diminishes the fastness of the finishes to wet processing.

The invention is illustrated but not limited by the following examples in which the parts and percentages are expressed by weight:

*Example 1*

0.25 part of an aqueous solution of ammonium polymethacrylate (containing 13.5% of polymeric material and 0.3% of free ammonia) is mixed with 90 parts of water. To this solution there are then added 6 parts of the aqueous dispersion of an acrylic resin obtainable commercially and consisting of a 16.5% aqueous dispersion of β-ethoxyethyl-methacrylate polymer, and 4 parts of a commercial aqueous copper-phthalocyanine paste (20% pigment), and the whole is thoroughly stirred. Mercerised poplin is padded through this preparation, mangled and dried in hot air. A level colouration is obtained.

When the above recipe is repeated except that the ammonium polymethacrylate is omitted, an extremely uneven distribution of colour is obtained.

*Example 2*

0.25 part of ammonium polymethacrylate solution (containing 13.5% of polymeric material and 0.3% of free ammonia) is added to 96 parts of water, followed by 0.14 part of ammonia solution (sp. gr. 0.880) and 2 parts of a thermo-hardening resin obtainable commercially and consisting of a 50% aqueous dispersion of the condensation product of (a) 2-ethoxy-ethanol modified urea-formaldehyde with (b) castor oil glyceryl phthalate. To the faintly opalescent solution so obtained there are then added 4 parts of the pigment paste defined in Example 1, and the whole is thoroughly stirred. Mercerised poplin is padded through the preparation, mangled and dried in hot air. The dried fabric is then subjected to a heat treatment at 150° C. for 3 minutes to effect hardening of the resin. A level colouring is obtained.

When the above recipe is repeated except that the ammonium polymethacrylate is omitted, an extremely uneven distribution of colour is obtained.

Results similar to those obtained in the foregoing examples have been obtained by using the following film-forming materials as binders for the pigments: polymerised methyl methacrylate, polymerised butyl methacrylate, polymerised methyl acrylate, polyvinyl chloride, polythene, rubber latex and water-soluble precondensates of acetone or urea with formaldehyde.

I claim:

1. In the coloring of cellulosic fabric by applying thereto an aqueous dispersion of an organic pigment and a bonding agent comprising a methacrylic ester polymer followed by drying of the treated fabric, the improvement which consists of adding to said aqueous dispersion ammonium polymethacrylate in quantity corresponding to between 0.025% to 0.075% by weight based on the total weight of the dispersion, whereby to improve the levelness of color on the resulting dyed fabric.

2. In the coloring of cellulosic fabric by applying thereto an aqueous dispersion of an organic pigment and a bonding agent comprising a urea-formaldehyde-glyceryl phthalate resin followed by drying of the treated fabric, the improvement which consists of adding to said aqueous dispersion ammonium polymethacrylate in quantity corresponding to between 0.025% to 0.075% by weight based on the total weight of the dispersion, whereby to improve the levelness of color on the resulting dyed fabric.

3. In the coloring of textile fabrics by a process which comprises applying thereto an aqueous dispersion containing as one ingredient a pigment and, as a second ingredient, a water-dispersible, resinous, organic, film-forming material which upon setting is water-insoluble and acts as a binder for the pigment, and thereafter drying the so treated fabric, the step which comprises incorporating with the aqueous dispersion a third distinct ingredient, said latter ingredient being a water-soluble salt selected from the group consisting of the alkali metal, ammonium and amine salts of a homo-polymer of an acid from the group consisting of acrylic and methacrylic acids, the quantity of said salt being between 0.01% and 0.20% by weight based on the total weight of the dispersion.

4. A process as claimed in claim 3 wherein the proportion of the water-soluble salt is from 0.025% to 0.075% by weight based on the total weight of the dispersion.

JACK AUGUSTUS RADLEY.

REFERENCES CITED

The following references are of record in the file of this patent:

UNITED STATES PATENTS

| Number | Name | Date |
|---|---|---|
| 1,976,679 | Fikentscher et al. | Oct. 9, 1934 |
| 2,275,991 | Powers et al. | Mar. 10, 1942 |
| 2,356,879 | Pense et al. | Aug. 29, 1944 |

OTHER REFERENCES

Ser. No. 397,138, Fikentscher et al. (A. P. C.), published May 4, 1943.